(12) United States Patent
Ou et al.

(10) Patent No.: US 9,215,742 B2
(45) Date of Patent: *Dec. 15, 2015

(54) METHOD AND APPARATUS FOR IMPROVING RRC CONNECTION PROCEDURE

(75) Inventors: Meng-Hui Ou, Taipei (TW); Yu-Hsuan Guo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 722 days.

This patent is subject to a terminal disclaimer.

(21) Appl. No.: 13/492,342

(22) Filed: Jun. 8, 2012

(65) Prior Publication Data

US 2012/0244866 A1  Sep. 27, 2012

Related U.S. Application Data

(63) Continuation of application No. 12/406,936, filed on Mar. 18, 2009, now Pat. No. 8,200,226.

(60) Provisional application No. 61/038,049, filed on Mar. 20, 2008.

(51) Int. Cl.
*H04W 76/02* (2009.01)
*H04W 36/36* (2009.01)
*H04W 36/08* (2009.01)

(52) U.S. Cl.
CPC ............ *H04W 76/028* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2004/0176093 A1* | 9/2004 | Raval et al. | 455/436 |
| 2005/0266846 A1 | 12/2005 | Kim | |
| 2007/0058669 A1* | 3/2007 | Hoffmann et al. | 370/466 |
| 2008/0188220 A1* | 8/2008 | DiGirolamo et al. | 455/434 |
| 2009/0046641 A1* | 2/2009 | Wang et al. | 370/329 |
| 2009/0175175 A1* | 7/2009 | Somasundaram et al. | 370/242 |

FOREIGN PATENT DOCUMENTS

EP   1876855 A2   1/2008

OTHER PUBLICATIONS

3GPP TS 25.303 V8.0.0 (Dec. 2007).
3GPP TS25.321 V8.0.0 (Dec. 2007).
3GPP TS25.331 V8.1.0 (Dec. 2007)—Document too large to submit, reference can be found in http://www.3gpp.org/ftp/Specs/archive/25_series/25.331/25331-810.zip.
3GPP TS36.321 V8.4.0 (Dec. 2008).
3GPP TS36.322 V8.4.0 (Dec. 2008).
3GPP TS36.331 V8.1.0 (Mar. 2008).
3GPP TS36.331 V8.4.0 (Dec. 2008).
3GPP TSG RAN WG2#16, Beijing, China, Oct. 9-13, 2000 (R2-002080).

(Continued)

*Primary Examiner* — Howard Williams
(74) *Attorney, Agent, or Firm* — Blue Capital Law Firm, P.C.

(57) ABSTRACT

The present invention provides a method for improving a Radio Resource Control (RRC) Connection procedure in user equipment (UE) of a wireless communication system. The method includes steps of performing an RRC Connection procedure, and resetting or re-establishing a lower layer protocol entity for Signaling Radio Bearers (SRBs) when a cell reselection occurs.

18 Claims, 4 Drawing Sheets

(56) References Cited

OTHER PUBLICATIONS

3GPP TSG RAN WG2#58bis, Orlando, USA, Jun. 25-29, 2007 (R2-072907).
3GPP TSG RAN WG2#59, Athens, Greece, Aug. 20-24, 2007 (R2-073178).
3GPP TSG RAN WG2#59, Athens, Greece, Aug. 20-24, 2007 (R2-073179).
3GPP TSG RAN WG2#63, Jeju Island, KR, Aug. 18-22, 2008 (R2-084786).
3GPP TSG RAN WG2#64, Prague, Czech Republic, Nov. 10-14, 2008 (R2-086620).
3GPP TSG RAN WG2#64, Prague, Czech Republic, Nov. 10-14, 2008 (R2-086996).
3GPP TSG RAN2 Meeting#64bis, Libljana, Slovenia, Jan. 12-16, 2009 (R2-090160).
3GPP TSG RAN2 Meeting#64bis, Libljana, Slovenia, Jan. 12-16, 2009 (R2-090161).
Office Action on corresponding foreign application (EP 09003842.3) from EPO dated May 15, 2013.
Office Action on corresponding foreign application (EP 12007513.0) from EPO dated May 15, 2013.
3GPP TS 36.331 V8.0.0 (Dec. 2007).
Office Action on corresponding foreign application (CN 201210165870.5) from SIPO dated Mar. 18, 2014.
Office Action on corresponding foreign application (TW102112297) from TIPO dated Sep. 22, 2014.

* cited by examiner

METHOD AND APPARATUS FOR IMPROVING RRC CONNECTION PROCEDURE

CROSS REFERENCE TO RELATED APPLICATIONS

This application is a continuation of U.S. patent application Ser. No. 12/406,936, filed Mar. 18, 2009, which claims the benefit of U.S. Provisional Application No. 61/038,049, filed Mar. 20, 2008, which are herein incorporated by reference in their entirety.

FIELD OF INVENTION

The present invention relates to a method and apparatus for improving a Radio Resource Control (RRC) Connection procedure, and more particularly, to a method and apparatus for improving the RRC Connection procedure by correctly resetting or re-establishing a lower layer protocol entity.

BACKGROUND

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple. Besides, one NB is responsible for controlling one or more cells, and thus a user equipment (UE) establishing connection with the network means the UE establishing connection with one cell of NB.

In LTE system, Radio Resource Control (RRC) layer of the UE merely includes two RRC states, i.e. RRC_IDLE and RRC_CONNECTED; and Radio Bearers for transmitting RRC signals, generally called Signalling Radio Bearers (SRBs), are divided into the following three types: 1. SRB0 is for exchanging RRC messages over a Common Control Channel (CCCH). Uplink (UL) and Downlink (DL) both use a Transparent Mode (TM) RLC entity; 2. SRB1 is for exchanging RRC messages and upper layer Non-Access Stratum (NAS) messages over a Dedicated Control Channel (DCCH). The UL and DL both use an Acknowledged Mode (AM) RLC entity; and 3. SRB2 is for exchanging upper layer NAS messages over DCCH. The UL and DL both use the AM RLC entity.

Through use of the SRBs, the RRC layers of the UE and the network can exchange RRC messages, as a basis for radio resource settings, for completing various RRC control procedures. For example, the UE in RRC_IDLE state can establish RRC connection with the network through a RRC Connection Establishment procedure, while the UE in $RRC_{13}$ CONNECTED state can re-establish RRC connection with the network through a RRC Connection Re-establishment procedure.

For the above two RRC connection procedures, the RRC layer of the UE shall generate a Connection Request message (or a Connection Re-establishment Request message), and the UE shall initiate a Random Access procedure in lower layer, i.e. MAC layer, for transmitting the Connection Request message (or the Connection Re-establishment Request message) to the network over CCCH. Meanwhile, the UE can perform radio measurement for neighboring cells, and reselect to another cell when measuring results reach to cell reselection criteria, i.e. a cell re-selection occurs. Detailed operation of the above RRC connection procedures is referable in related specification and not narrated herein.

According to the current specification, when the cell reselection occurs during an ongoing RRC Connection procedure, the RRC layer of the UE would then generate a new Connection Request message (or a new Connection Re-establishment Request message) to the lower layer for transmission to a new selected cell. However, since the MAC layer is not reset and the RLC layer mapping to the SRB is not re-established as well, the Random Access procedure for an original cell is still executed, causing the Random Access procedure for the new cell cannot be correctly performed. In addition, if the Connection Request message (or the Connection Re-establishment Request message) for the original cell cannot be sent out before the cell reselection occurs, there would be two or more Connection Request messages (or Connection Re-establishment Request messages) in a transmission buffer of the RLC layer. As a result, the follow-up RRC Connection procedure cannot be completed correctly, and may cause errors, such as sending a redundant Connection Request message (or Connection Re-establishment Request message) to the new cell.

SUMMARY

It is therefore an objective of the present invention to provide a method and apparatus for improving a Radio Resource Control (RRC) Connection procedure in user equipment (UE) of a wireless communications system.

According to the present invention, a method for improving a Radio Resource Control (RRC) Connection procedure in user equipment (UE) of a wireless communication system is disclosed. The method includes steps of performing an RRC Connection procedure; and resetting or re-establishing a lower layer protocol entity for a Signalling Radio Bearer (SRB) when a cell reselection occurs.

According to the present invention, a communications device for improving a Radio Resource Control (RRC) Connection procedure in user equipment (UE) of a wireless communication system is disclosed. The communications device includes a processor for executing a program code, and a memory, coupled to the processor, for storing the program code. The program code includes steps of performing an RRC Connection procedure; and resetting or re-establishing a lower layer protocol entity for a Signalling Radio Bearer (SRB) when a cell reselection occurs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
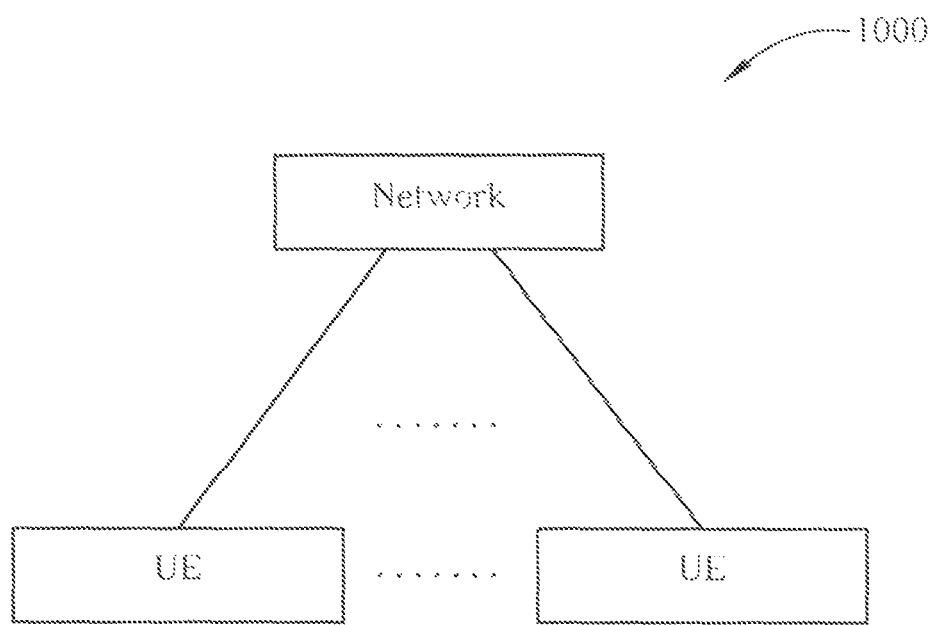
FIG. 1 is a schematic diagram of a wireless communications system.

Please refer to FIG. 1, which illustrates a schematic diagram of a wireless communications system 1000. The wireless communications system 1000 can be a 3G mobile telecommunications system, an LTE (long-term evolution) system or other mobile communications systems, and is briefly composed of a network and a plurality of user equipment (UEs). In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 2:
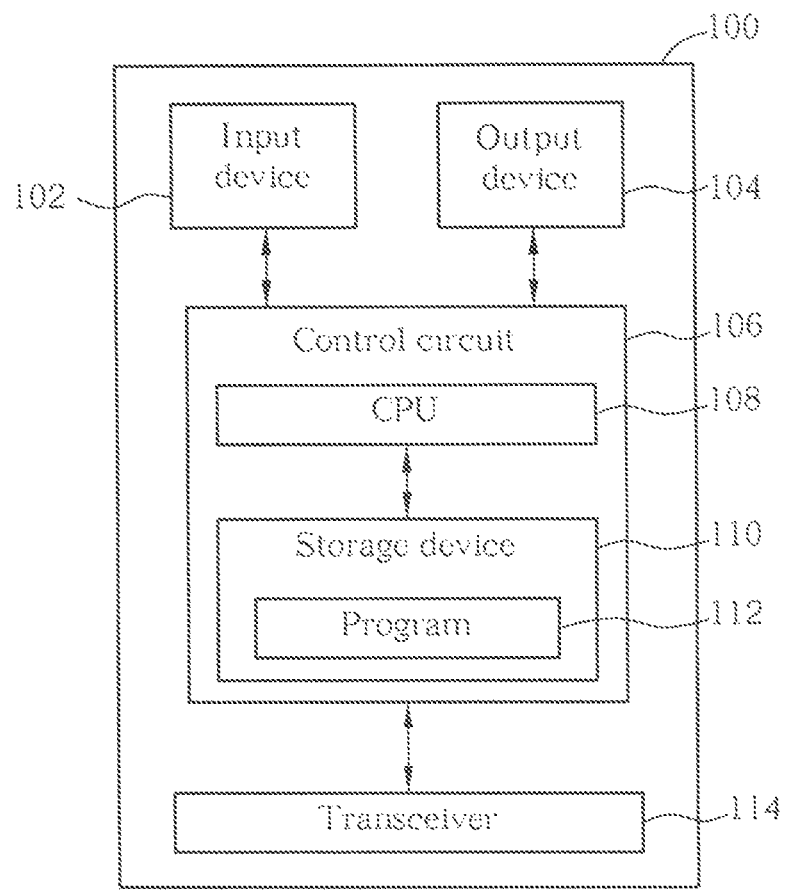
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 1 00 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
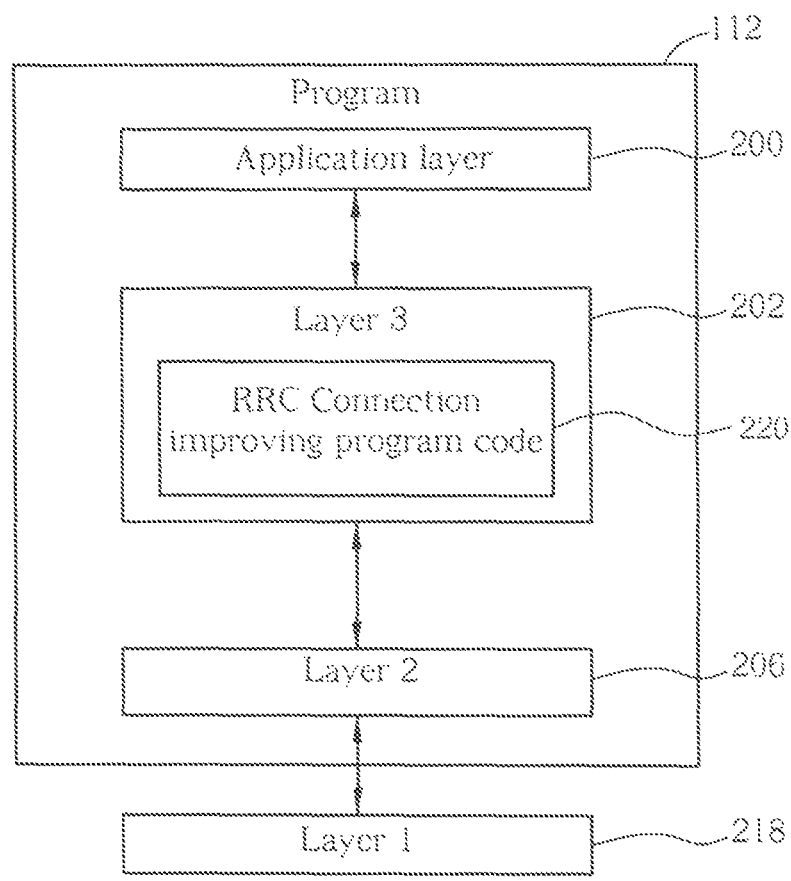
FIG. 3 is a diagram of program code of FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 comprises a Radio Resource Control (RRC) layer, and performs radio resource control. The Layer 2 206 comprises a Radio Link Control (RLC) layer and a Medium Access Control (MAC) layer, and performs link control. The Layer 1 218 performs physical connections. Besides, the Layer 3 202 can exchange RRC messages with the network through Signalling Radio Bearers (SRBs) so as to complete various RRC procedures.

In the LTE system, when an RRC Connection procedure is performed, the Layer 3 202 shall generate a Connection Request message (or a Connection Re-establishment Request message) and a Random Access procedure in the MAC layer shall be initiated for transmitting the Connection Request message (or the Connection Re-establishment Request message) to the network over CCCH. At this time, if a cell reselection occurs, the Layer 3 202 would then generate a new Connection Request message (or a new Connection Re-establishment Request message) to the lower layer for transmission to a new cell. In such a situation, the embodiment of the present invention provides an RRC Connection improving program code 220 for accurately resetting or re-establishing a lower layer protocol entity to complete the follow-up RRC Connection procedure.

Figure 4:
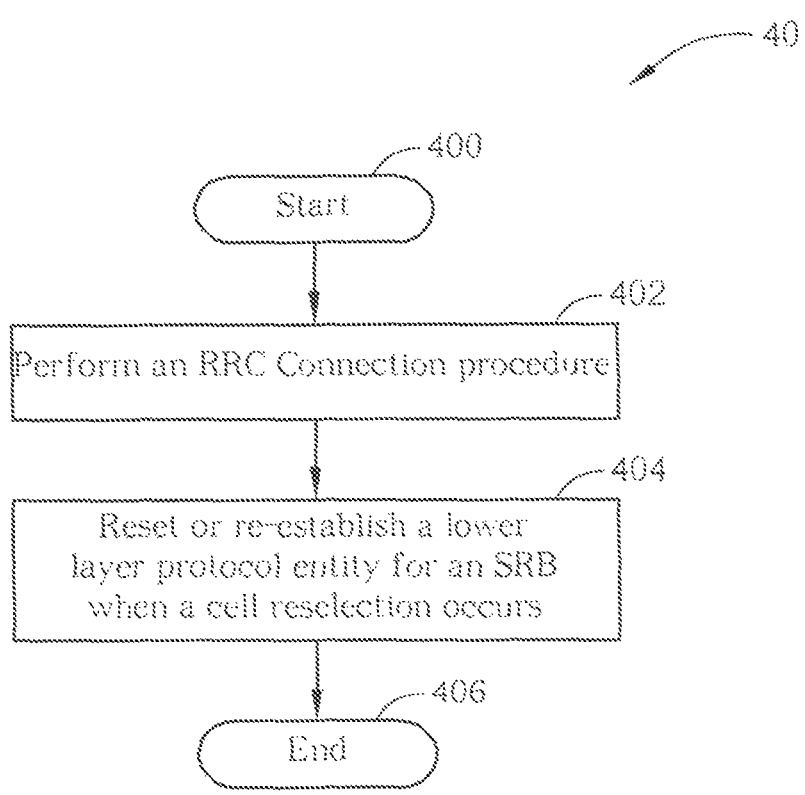
FIG. 4 is a flowchart of a process according to an embodiment of the present invention.

Please refer to FIG. 4, which illustrates a schematic diagram of a process 40. The process 40 is utilized for improving an RRC Connection procedure in a UE of the wireless communications system 1000, and comprises the following steps:

Step 400: Start.

Step 402: Perform an RRC Connection procedure.

Step 404: Reset or re-establish a lower layer protocol entity for an SRB when a cell reselection occurs.

Step 406: End.

According to the process 40, if the cell reselection occurs during the RRC connection procedure performed by the UE, the lower layer protocol entity for the SRB would be reset or re-established in the embodiment of the present invention. Moreover, the step of resetting or re-establishing the lower layer protocol entity for the SRB further includes re-establishing a Transparent Mode (TM) RLC entity and resetting a Medium Access Control (MAC) entity.

Thus, when cell reselection occurs during the RRC Connection Procedure, the UE would reset or re-establish the lower layer protocol entity for the SRB so as to discard a previous RRC Connection Request message (or a RRC Connection Re-establishment Request message) and to stop an on-going Random Access procedure. As a result, the follow-up RRC Connection procedure can be correctly completed, so as to prevent the previous Connection Request messages (or the Connection Re-establishment Request messages) from being transmitted to the new cell or prevent the Random Access procedure being performed inaccurately.

Preferably, the above RRC Connection procedure can be an RRC Connection establishment procedure or an RRC Connection Re-establishment procedure. Besides, in the embodiment of the present invention, re-establishing the TM RLC entity further includes flushing a transmission buffer of the RLC entity, so that all un-transmitted RLC Service Data Units (SDUs) in the transmission buffer can be discarded.

In summary, when the cell reselection occurs during the RRC Connection Procedure, the embodiment of the present invention resets or re-establishes the lower layer protocol entity for the SRB, so as to correctly complete the follow-up RRC Connection procedure and avoid errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed:

1. A method for improving a Radio Resource Control (RRC) Connection procedure in a user equipment (UE) of a wireless communication system, the method comprising:
   performing a RRC Connection Re-establishment procedure; and
   re-establishing a Radio Link Control (RLC) entity for a Signalling Radio Bearer (SRB) when a cell reselection occurs.

2. The method of claim 1, wherein the RRC Connection procedure is an RRC Connection establishment procedure.

3. The method of claim 1, wherein the RRC Connection procedure is an RRC Connection Re-establishment procedure.

4. The method of claim 1, wherein the SRB is an SRB0.

5. The method of claim 4, wherein the SRB the SRB0 is for exchanging RRC messages over a Common Control Channel (CCCH).

6. The method of claim 1, wherein the RLC entity is a Transparent Mode (TM)RLC entity.

7. The method of claim 1, wherein re-establishing the RLC entity for the SRB comprises flushing a transmission buffer of the RLC entity.

8. The method of claim 1, wherein the cell reselection occurs when measurement result for a neighboring cell meets a cell reselection criteria.

9. The method of claim 1, wherein the cell reselection is based on a radio measurement for neighboring cells.

10. A communication device for improving a Radio Resource Control (RRC) Connection procedure in a user equipment (UE) of a wireless communication system, the communication device comprising:
- a processor for executing a program code; and
- a memory coupled to the processor for storing the program code, wherein the program code comprises:
  - performing a RRC Connection Re-establishment procedure; and
  - re-establishing a Radio Link Control (RLC) entity for a Signalling Radio Bearer (SRB) when a cell reselection occurs.

11. The communication device of claim 10, wherein the RRC Connection procedure is an RRC Connection establishment procedure.

12. The communication device of claim 10, wherein the RRC Connection procedure is an RRC Connection Re-establishment procedure.

13. The communication device of claim 10, wherein the SRB is an SRB0.

14. The communication device of claim 13, wherein the SRB the SRB0 is for exchanging RRC messages over a Common Control Channel (CCCH).

15. The communication device of claim 10, wherein the RLC entity is a Transparent Mode (TM) RLC entity.

16. The communication device of claim 10, wherein re-establishing the RLC entity for the SRB comprises flushing a transmission buffer of the RLC entity.

17. The communication device of claim 10, wherein the cell reselection occurs when measurement result for a neighboring cell meets a cell reselection criteria.

18. The communication device of claim 10, wherein the cell reselection is based on a radio measurement for neighboring cells.

* * * * *